(12) United States Patent
Novak et al.

(10) Patent No.: US 7,219,308 B2
(45) Date of Patent: May 15, 2007

(54) USER INTERFACE FOR MEDIA PLAYER PROGRAM

(75) Inventors: Michael Novak, Redmond, WA (US); Jonathan M. Cain, Seattle, WA (US); Tedd K. Dideriksen, Woodinville, WA (US); David M. Nadalin, Sammamish, WA (US); Patrick N. Nelson, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 727 days.

(21) Appl. No.: 10/178,187

(22) Filed: Jun. 21, 2002

(65) Prior Publication Data

US 2003/0237043 A1 Dec. 25, 2003

(51) Int. Cl.
G06F 3/00 (2006.01)
(52) U.S. Cl. ........................ 715/768; 715/815; 715/716
(58) Field of Classification Search ................ 715/726, 715/814, 815, 716, 768
See application file for complete search history.

(56) References Cited

U.S. PATENT DOCUMENTS

| | | | |
|---|---|---|---|
| 5,060,170 A | | 10/1991 | Bourgeois et al. |
| 5,410,698 A | * | 4/1995 | Danneels et al. ........... 719/331 |
| 5,473,745 A | * | 12/1995 | Berry et al. ................ 715/788 |
| 5,602,997 A | * | 2/1997 | Carpenter et al. .......... 715/764 |
| 5,657,049 A | | 8/1997 | Ludolph et al. |
| 5,790,122 A | | 8/1998 | Cecchini et al. |
| 5,883,626 A | | 3/1999 | Glaser et al. |
| 5,959,628 A | | 9/1999 | Cecchini et al. |
| 5,983,190 A | * | 11/1999 | Trower et al. .............. 704/276 |
| 6,191,800 B1 | | 2/2001 | Arenburg et al. |
| 6,226,618 B1 | | 5/2001 | Downs et al. |
| 6,262,724 B1 | * | 7/2001 | Crow et al. ................. 715/723 |
| 6,333,753 B1 | * | 12/2001 | Hinckley .................... 715/768 |
| 6,345,256 B1 | | 2/2002 | Milsted et al. |
| 6,389,403 B1 | | 5/2002 | Dorak, Jr. |
| 6,398,245 B1 | | 6/2002 | Gruse et al. |
| 2001/0011995 A1 | * | 8/2001 | Hinckley et al. ........... 345/156 |
| 2001/0033296 A1 | * | 10/2001 | Fullerton et al. ........... 345/730 |
| 2002/0001395 A1 | | 1/2002 | Davis et al. |
| 2002/0002468 A1 | | 1/2002 | Spagna et al. |
| 2002/0033844 A1 | | 3/2002 | Levy et al. |
| 2002/0054137 A1 | * | 5/2002 | Dvorak ....................... 345/804 |
| 2002/0069218 A1 | | 6/2002 | Sull et al. |
| 2002/0082730 A1 | | 6/2002 | Capps et al. |
| 2002/0099737 A1 | | 7/2002 | Porter et al. |
| 2002/0103920 A1 | | 8/2002 | Berkun et al. |
| 2002/0143976 A1 | | 10/2002 | Barker et al. |
| 2002/0157095 A1 | | 10/2002 | Masumitsu et al. |
| 2002/0184180 A1 | * | 12/2002 | Debique et al. ............ 707/1 |

(Continued)

OTHER PUBLICATIONS

Lycos, Inc, Sonique, Feb. 2001, Lycos, Inc., Version 1.90.*

(Continued)

Primary Examiner—Kristine Kincaid
Assistant Examiner—Ryan Pitaro
(74) Attorney, Agent, or Firm—Senniger Powers

(57) ABSTRACT

Methods and system for enhancing user experience when rendering digital media content. Defining a visible region of the window in which a media player user interface (UI) is presented to clip undesirable portions of the window provides an improved media player UI. Further aspects are directed to enhancing user experience when rendering digital media content in full screen presentation mode.

47 Claims, 9 Drawing Sheets

U.S. PATENT DOCUMENTS

| | | | |
|---|---|---|---|
| 2003/0105743 A1* | 6/2003 | Ireton | 707/3 |
| 2004/0006575 A1 | 1/2004 | Visharam et al. | |
| 2004/0172593 A1 | 9/2004 | Wong et al. | |
| 2004/0267693 A1 | 12/2004 | Lowe et al. | |
| 2005/0234958 A1 | 10/2005 | Sipusic et al. | |

OTHER PUBLICATIONS

Shiova, "Pure Metal", Jul. 19, 1999, Lycos, Edition: Damaged.*

Thurrott, Paul, "Paul Thurrott's SuperSite for Windows: Windows Media Player 8 Gallery", Apr. 10, 2001, Internet: http://www.winsupersite.com/showcase/windowsxp_wmp8.asp, pp. 1-3, Retrieved: Aug. 10, 2006.*

Thurrott, Paul, "Paul Thurrott's SuperSite for Windows: Windows XP Beta 2: The SuperSite Review", Mar. 31, 2001, Internet: http://www.winsupersite.com/reviews/windowsxp_beta2.asp, pp. 1-13, Retrieved: Aug. 10, 2006.*

Microsoft.com, "Bill Gates Announces the Availability of Microsoft Windows XP Beta 2", Mar. 26, 2001, Internet: http://www.microsoft.com/presspass/press/2001/Mar01/03-26XPBeta2PR.mspx, pp. 1-3, Retrieved: Aug. 10, 2006.*

Edward Swlerk, et al., The Roma Personal Metadata Service, Mobile Networks and Applications vol. 7, pp. 407-418, 2002.

* cited by examiner

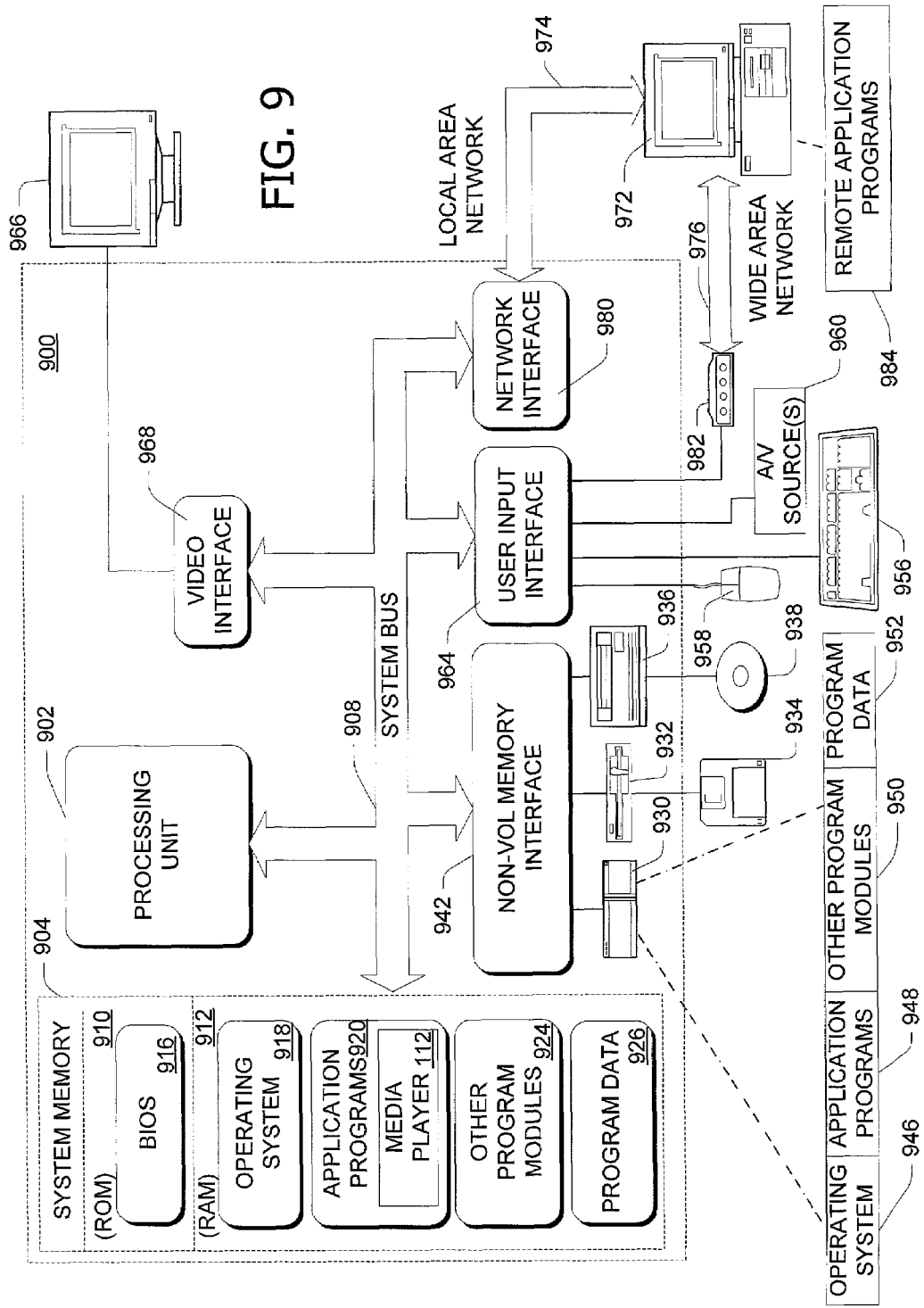

USER INTERFACE FOR MEDIA PLAYER PROGRAM

TECHNICAL FIELD

The present invention relates to the field of processing digital media content. In particular, this invention relates to improved user interfaces and media player functionality for enhancing user experience.

BACKGROUND OF THE INVENTION

Due to recent advances in technology, computer users are now able to enjoy many features that provide an improved user experience, such as playing various media and multimedia content on their personal or laptop computers. For example, most computers today run media player applications able to play compact discs (CDs). This allows users to listen to their favorite musical artists while working on their computers. Many computers are also equipped with digital versatile disc (DVD) drives enabling users to watch movies.

A typical media player application provides a user interface (UI) that allows the user to interact with the application. In general, user interfaces provide controls or buttons that the user engages to cause a predetermined result. A software application such as a media player may have several buttons that permit the user to play, pause, fast-forward, reverse, and control the volume of a particular piece of media being rendered by the player. In the past, UIs have been generally fixed insofar as their layout and functionality are concerned. One primary reason for this stems from the desire to impart standardization to various UIs. Yet, against the backdrop of standardized UIs, there is a desire to impart UIs with a more user friendly, aesthetically pleasing look and improved functionality.

One known technique for changing the look of a media player UI involves providing a "skin" that serves as the visual portion of the UI, that is, the portion that the user sees when they interact with an application.

As users become more familiar with advanced features on their computers, such as those mentioned above, their expectations for various additional innovative features will undoubtedly continue to grow. For example, consider a media player software application that enables a user to play a CD on his or her computer. Typical applications allow the user to display track information associated with the CD by clicking on the appropriate UI. Such track information usually includes track numbers, song titles, playing times, and the like. Notwithstanding these advances, the user will continue to desire further advancements in delivering content-related information to improve the experience.

Accordingly, this invention arose out of concerns for providing improved systems and methods for processing media content that provide an improved, rich, and robust user experience.

SUMMARY OF THE INVENTION

The invention meets the above needs and overcomes one or more deficiencies in the prior art by providing improved user experience when playing various media, including CDs and DVDs. The invention enhances user experience for digital media by providing an enhanced media player UI that is "lighter," customizable, and more aesthetically pleasing to the user. In one embodiment, the UI allows the user to selectively hide the title bar, menu bar, frame, and other areas around the media player while maintaining the usability of the hidden bars. The improved UI also permits displaying content-related images, such as album cover art. Another embodiment of the invention enhances playback in the full screen presentation mode. In this mode, the invention dynamically changes the visual rendering element to allow transport controls and the like to appear on-screen as desired by the user. Advantageously, the controls do not unduly interrupt or obscure full screen viewing by the user. Full screen viewing is also improved by the presence of a current playlist with direct media access. Thus, the software routines of the invention increase the attractiveness of the media player program to digital media enthusiasts. Moreover, the features of the present invention described herein are less laborious and easier to implement than currently available techniques as well as being economically feasible and commercially practical.

Briefly described, a method embodying aspects of the present invention includes rendering a media file by a media player program executed on a computer. In this instance, the computer has a display for presenting a user interface (UI) associated with the media player program. The method further includes defining a window in which the media player program UI is presented on the display and setting a visible region of the window. The window has a frame controlled by an operating system of the computer and the visible region excludes at least a portion of the frame from being viewable on the display. Selectively removing the visible region of the window in response to user input via an input device makes the window and the frame viewable on the display.

In another embodiment, a method of processing media content includes rendering a media file by a media player program executed on a computer. The media file in this method has a visual rendering element and the computer has a display. The media player program plays the visual rendering element of the media file in a full screen presentation mode on the display. The method also includes selectively presenting a playback control UI on the display in response to user input via an input device. The playback control UI is viewable with the visual rendering element while maintaining the full screen presentation mode.

Yet another embodiment of the invention is directed to a method of processing media content including rendering a media file by a media player program executed on a computer. In this embodiment, the method includes displaying a playlist associated with one or more media files, including the media file being currently rendered by the media player program, while maintaining the full screen presentation mode. Additionally, the method includes providing direct media access to each item in the playlist in response to user input via an input device.

Computer-readable media having computer-executable instructions for performing methods of processing media content embody further aspects of the invention.

A system embodying aspects of the invention includes a computer executing a media player program for rendering a media file. The computer has a display for presenting a UI associated with the media player program. The computer presents the media player program UI in a window of the display, which has a frame controlled by an operating system of the computer. A visible region applied on the window excludes at least a portion of the frame from being viewable on the display unless selectively removed in response to user input via an input device.

Alternatively, the invention may comprise various other methods and apparatuses.

Other features will be in part apparent and in part pointed out hereinafter.

BRIEF DESCRIPTION OF THE DRAWINGS

FIG. 9 is a block diagram illustrating one example of a suitable computing system environment on which the invention may be implemented.

Corresponding reference characters indicate corresponding parts throughout the drawings.

DETAILED DESCRIPTION OF THE INVENTION

Figure 1:
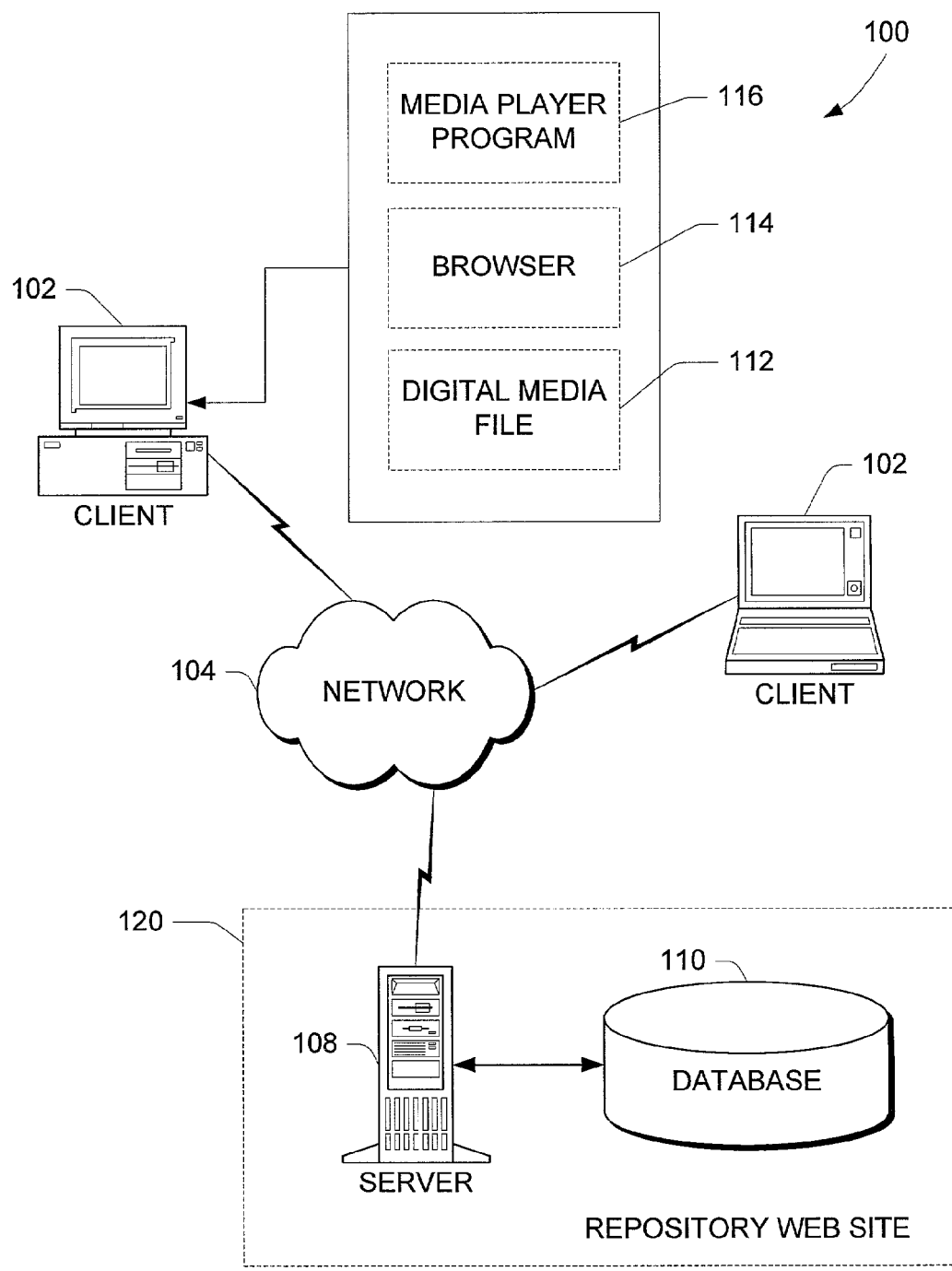
FIG. 1 is a block diagram of a computer system embodying aspects of one embodiment of the present invention.

Referring now to the drawings, FIG. 1 illustrates an exemplary network environment in which the present invention can be implemented for enhancing user media playing experience. A system 100 has one or more client computers 102 coupled to a data communication network 104. One or more server computers 108, sometimes referred to as "web servers" or "network servers," are also coupled to the network 104. In turn, the client computer 102 can access the server 108 via network 104. As shown in FIG. 1, the system 100 also includes one or more databases 110 associated with server 108.

In this example, network 104 is the Internet (or the World Wide Web). However, the teachings of the present invention can be applied to any data communication network. Server 108 and client computer 102 communicate in the illustrated embodiment using the hypertext transfer protocol (HTTP), a protocol commonly used on the Internet to exchange information.

The invention provides software routines that, when executed by a computer, render media content and retrieve, store, and display contextual information. Referring further to FIG. 1, the user's computer 102 accesses a digital media file 112, such as one residing on a compact disc (CD), digital versatile disc (DVD), or other suitable computer storage media. Client computer 102 also executes a web browser 114 and a media player application program 116. In this embodiment, server 108 and its associated database 110 form a repository web site 120 with which computer 102 communicates via network 104 to access data stored in database 110. The media player program 116 can be any suitable media player that is configured to play digital media so that a user can experience the content that is embodied on the media. For example, suitable media player applications include a CD media player application and a DVD media player application.

The present invention involves innovative techniques, systems, and methods that enable media content to be packaged and delivered in a manner that can greatly enhance the user experience. One aspect of the present invention enables the user to access, retrieve, and display so-called metadata. In particular, this aspect of the invention enables media player program 116 executed on a computing device or client, to access, retrieve, and display the metadata in conjunction with rendering the media content. Those skilled in the art are familiar with metadata, which is simply information about data. In the context of the present invention, metadata includes information related to specific content of digital media file 112 being played on the media player 116. Basic metadata includes title, composer, performer, genre, description of content, and the like. Extended metadata includes cover art, performer biographies, reviews, related performers, where to buy similar items, upcoming concerts, ticket sales, URLs to other related experiences including purchase opportunities, and the like.

In the embodiment of FIG. 1, server 108 matches the metadata stored in database 110 to the specific media content that is being experienced by the user. Server 108 then returns the metadata to the user's computer 102. In the examples herein, the media content of digital media file 112 is described in the context of content embodied on a CD or a DVD. It is to be appreciated and understood that the media content can be embodied on any suitable media, including digital files downloaded to the client computer's memory, and that the specific examples described herein are given to further understanding of the inventive principles. For convenience, digital media file 112 refers to one or more files representing, for example, a single song track or a collection of tracks such as would be found on an audio CD. The media content can include, without limitation, specially encoded media content in the form of, for example, an encoded media file such as media content encoded in Microsoft® Windows Media™ format using the Microsoft® Windows Media™ Player program.

Various features of the described systems and methods include a set of databases, client side executable code, and a series of server side processes that provide for querying and maintaining the databases. One logical organization of exemplary system 100 includes a process to map a piece of physical media (embodied by digital media file 112) to a unique database key or, as referred to herein, a "logical ID." This organization also includes a query process to retrieve information from database 110 based on the unique database key or logical ID. A data return mechanism and schema set returns data and a user feedback system allows users to contribute to the set of understood keys or logical IDs. The logical organization of system 100 also includes a set of management processes that handle user contributions.

The resultant system 100 of FIG. 1 permits the user to play media file 112 on an enabled media playing device (e.g., computer 102 running Microsoft® Windows® operating system and Windows Media™ Player) and expect not only to experience the media content but also have access to all manner of related metadata. In addition, the user community has the ability to contribute key information to the process to improve the experience for other users.

In system 100, the user on the client side inserts the media into computer 102, or otherwise causes the content of media file 112 to be experienced. Computer 102 uses a physical ID identifying media file 112 to access the logical ID that uniquely identifies the media. Server 108 then uses the logical ID as the basis for metadata queries of database 110. These queries are designed to retrieve a rich set of related metadata for the user. Server 108 then returns the metadata to client computer 102 via network 104 for display to the user.

The description below will provide detailed aspects of the above systems and various methods that all contribute to a much richer user experience.

Figure 2:
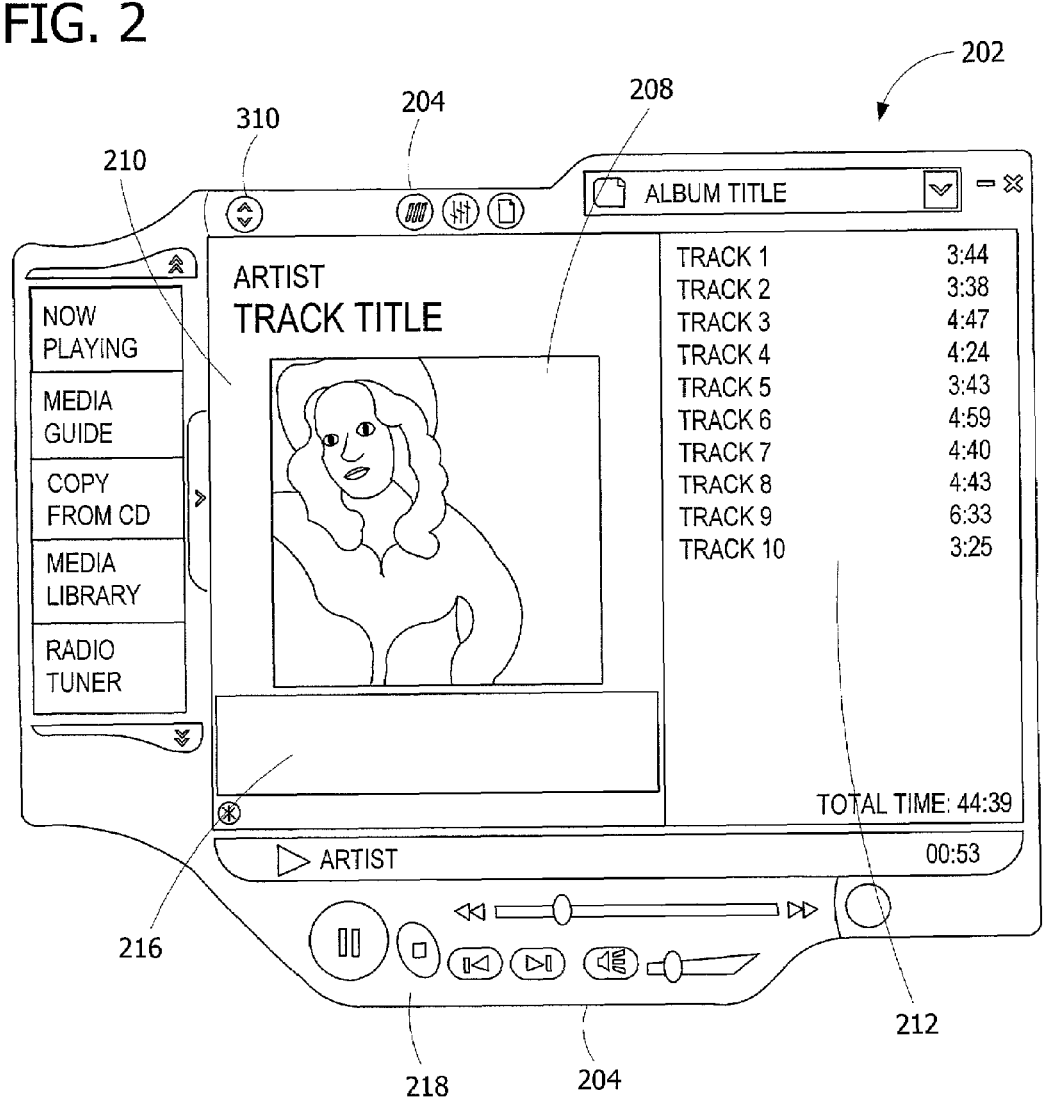
FIG. 2 is an exemplary embodiment of a frameless UI displayed in a media player application program according to one embodiment of the present invention.
Figure 3:
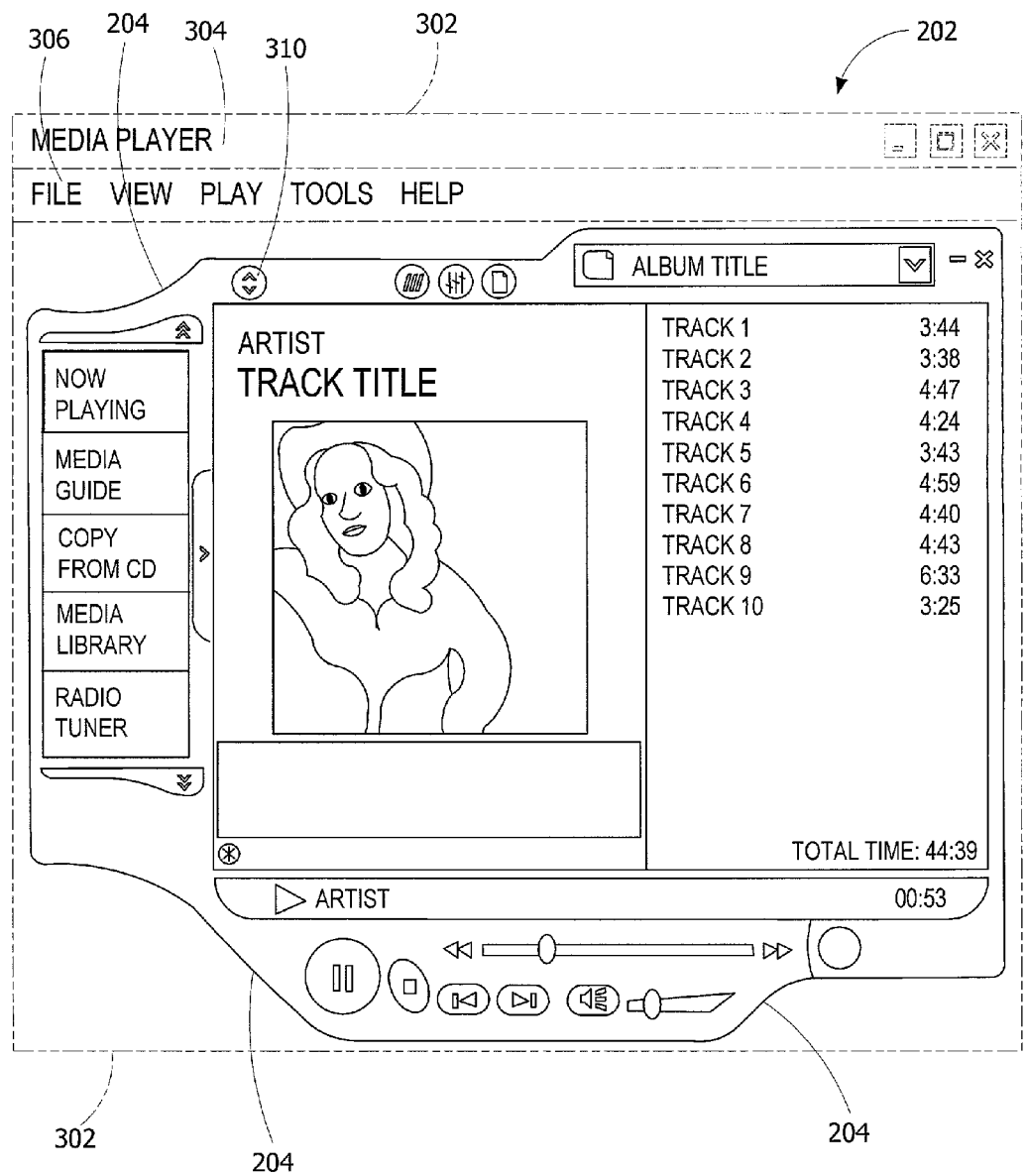
FIG. 3 is an exemplary embodiment of a framed UI displayed in a media player application program according to one embodiment of the present invention.

Referring now to FIG. 2 and FIG. 3, the present invention provides an enhanced media player user interface (UI) 202 that is "lighter," customizable, and more aesthetically pleasing to the user. Nearly all applications use the screen to display the data they manipulate. An application paints images, draws figures, and writes text so that the user can view data as it is created, edited, and printed. Due to the nature of multitasking operating systems, applications must cooperate with one another when accessing the screen. To keep all applications functioning smoothly and cooperatively, the operating system (OS) manages all output to the screen. Applications use windows as their primary output device rather than the screen itself. The OS supplies display device contexts that uniquely correspond to the windows. Applications use display device contexts to direct their output to the specified windows. Drawing in a window (i.e., directing output to it) prevents an application from interfering with the output of other applications and allows applications to coexist with one another.

Every window has a visible region that defines the window portion visible to the user. The OS changes the visible region for the window whenever the window changes size or whenever another window is moved such that it obscures or exposes a portion of the window. In general, the exemplary UI 202 allows the user to selectively hide the title bar, menu bar, frame, and other areas around the media player while maintaining the usability of the hidden bars. In other words, media player program 116 clips the standard title bar, menu bar, and/or frame from its window to better maintain a small visual footprint on the desktop of computer 102.

As shown in FIG. 2, this embodiment of UI 202 has a visible region defined by an outer edge 204. The UI 202 displays an image 208 in its "Now Playing" visualization area 210. In this instance, the image 208 is, for example, content-related art, such as album cover art, or simply a placeholder image displayed by media player program 116. FIG. 2 also illustrates a playlist 212, which includes, for example, song titles for each of the tracks on a CD being played by the media player. An area 216 of UI 202 is available for displaying extended metadata. In addition, the illustrated UI 202 includes a playback controls UI 218.

Referring now to FIG. 3, even after media player program 116 has established the look of FIG. 2, the user can bring back the hidden areas. The UI 202 selectively displays a frame 302, which defines the application window for media player program 116. The UI 202 also includes a title bar 304 and a menu bar 306 in this embodiment. By illustrating the frame 302, title bar 304 and menu bar 306 in phantom, the figure indicates that these on-screen elements are generally hidden from the user and "pop up" only as desired in response to user input. Thus, the invention provides a visually enhanced user interface without losing standard windows title bar or menu bar user interface controls.

According to one embodiment of the invention, media player program 116 provides three modes for UI 202, namely, Always On, Auto-Hide, and Hide. The player in FIG. 2 has a quick-access button 310 that toggles between the modes, depending upon what option the user last selected.

In the Always On mode, title bar 304, menu bar 306, frame 302 and the like are never hidden. This mode effectively turns off the hiding of the application frame and media player program 116 behaves as any other application with a title bar.

In contrast, the Hide and Auto-Hide options allow the user to opt for removing the title bar 304, menu bar 306, frame 302 and the like. The Auto-Hide mode acts as a default option in this embodiment. Media player program 116 automatically hides the portions of the application window outside the outer edge 204 to allow the display to take on a more artistic look. The UI 202 automatically shows title bar 304, for example, when the user presses a menu-access shortcut (i.e., an accelerator key such as ALT-F, which drops the file menu) or other specified key (e.g., ALT, which switches focus to the menu bar). The UI 202 also automatically shows the hidden features when the user hovers the mouse cursor over the on-screen area where the user would expect to find title bar 304. After the user completes his or her action, title bar 304, menu bar 306, frame 302, and any other selected elements of the application window once again become hidden to the user. In this embodiment, the user can re-hide these elements by moving the mouse cursor away from title bar 304 or by selecting a menu option.

The Hide mode operates in a similar manner to the Auto-Hide mode but, in this instance, hovering the mouse cursor or pointer over the affected title bar area will not make the hidden elements visible again. On the other hand, the user can still make these areas visible by using menu-access shortcuts to provide accessibility for all features of the player.

Referring further to the Auto-Hide mode of UI 202 in FIGS. 2 and 3, those skilled in the art recognize that known computer operating systems automatically give an application a title bar and a window frame (e.g., a border). These features provide standard user interface controls for every application that runs on the operating system platform. In one embodiment of the present invention, a set of application programming interfaces (APIs) available for the OS, referred to as Region functions, for example, allow an application to "clip" off part of its window. Thus, the clipped portion is no longer visible on-screen. Using the Region functions to clip title bar 304 as well as other areas of the media player's application window allows media player program 116 to take any one of many desirable, aesthetically pleasing shapes. Advantageously, the present invention provides user interface enhancements of this type without the negative impact of losing standard user interface controls provided by the clipped areas such as title bar 304. As such, the familiar window look of title bar 304, menu bar 306, and frame 302 is still available to the user, if desired, along with the user interface controls provided by these elements.

In one embodiment, the present invention implements UI 202 by using a skins engine to generate a region (i.e., a sum of the non-transparent areas of the skin) to display. This region is then applied to the main application's window via the operating system's region API described above. Doing so provides a "skinned" application with a shape defined by the skin. In this instance, title bar 304 and frame 302 are no longer visible. In general, applications cannot change the visible region directly, but the OS automatically uses the visible region to create a clipping region for any display device context retrieved for the window. The clipping region determines where the system permits drawing. The OS automatically updates underlying windows that show through the non-rectangular window. In the present embodiment, media player program 116 changes the clipping region by using an API such as the SetWindowRgn function of the Windows® operating system available from Microsoft Corporation.

The SetWindowRgn function sets the window region of a window, which in turn determines the area within the window where the OS permits drawing. The OS does not display any portion of a window that lies outside of the window region. Advantageously, the present invention, in one embodiment, uses this API to create irregularly shaped windows.

As described above, media player application 116 watches the cursor position on a timer and monitors when the user moves the mouse cursor over the area that title bar 304 would normally occupy. When the user hovers over this area for a brief moment, the application saves the currently applied region and then removes the region from the application's window. This has the effect of once again making title bar 304, menu bar 306, and frame 302 visible. After this change, media player program 116 continues to watch the pointer position and shortly after the mouse pointer leaves the area of title bar 304, the saved region is once again restored and title bar 304 and the other outlying areas are hidden once again.

FIG. 2 further illustrates an example of album art (or a placeholder image) displayed in the "Now Playing" visualization area of the media player program UI. This aspect of the invention will be described in greater detail below.

In operation, computer 102 executes media player program 116 for rendering media file 112 and presents UI 202 on its display (see monitor 966 in FIG. 9). Media player 116 defines a window in which the media player program UI 202 is presented on the display. The window has frame 302 controlled by the computer's operating system. By setting a visible region of the window to exclude at least a portion of frame 302 from being viewable on the display, the invention presents a "lighter," more aesthetically pleasing look to the user. In one embodiment, the invention calls for selectively removing the portion of the frame in response to user input via an input device (see keyboard 956 or pointing device 958 in FIG. 9). When the portion is made visible, the window and frame are viewable on the display in their entirety.

Figure 4:
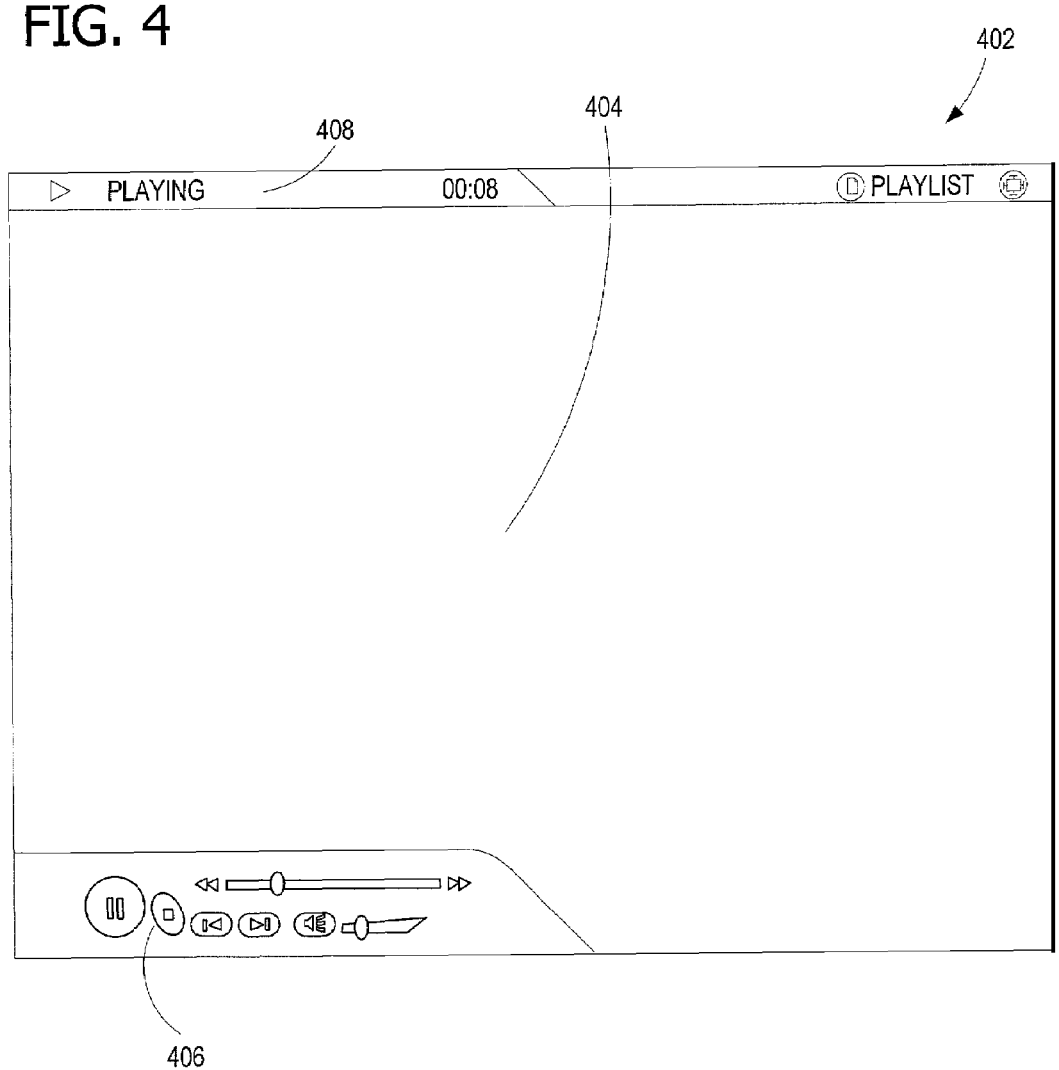
FIG. 4 is an exemplary embodiment of a full screen presentation mode with a playback control UI in a media player application program according to one embodiment of the present invention.

FIG. 4 illustrates an exemplary screen shot of a user interface 402 for media player program 116. In this instance, media player program 116 is rendering media file 112 in a full screen presentation mode. Most media players have the ability to show media in a presentation, or full screen, mode in which the visual representation of the media is shown over the entire screen, occluding the taskbar, etc. and all other applications. A typical problem with this display mode is the inability to convey status or give users the ability to easily control the playback experience while in full screen mode.

When playing a video, for example, media player program 116 allows the user the option of watching a full screen representation 404 of media file 112, i.e., resizing the images to cover the entire screen of the computer monitor. According to the invention, the "skinned" full screen user interface 402 enhances user experience with its ability to selectively present a controls UI, including a set of playback, or transport, controls 406 and a status pane 408. As an example, once the video or DVD starts playing, the controls appear at the top and bottom of the screen. The controls enable the user to play the media file 112, see its status, view a playlist of the available tracks or chapters (see FIG. 6), and return the media player 116 to full mode (as opposed to full screen mode).

The playback controls 406 and the status pane 408 smoothly slide on to or off of the screen, or fade in or out, or otherwise become available on-screen to improve the level of control and visual feedback of media player 116. Advantageously, this permits users that are unfamiliar with the use of hotkeys to control the playback experience when watching in full screen mode. The full screen controls 406, 408 generally slide off the screen a few moments after appearing and remain hidden. The user can display controls 406, 408 by hovering the mouse pointer near the top or bottom edge of the screen in one embodiment or by simply moving the mouse pointer in another embodiment.

In one embodiment of the invention, a skins engine implements the full screen user interface 402 of FIG. 4. Because the skins engine renders the full-screen controls, they can be easily authored and a wide variety of previously unavailable playback controls and status information can be presented to the user. In a manner similar to that described above, the invention constructs a region and applies it to the visual image source. This permits clipping controls 406, 408 to generally any desired shape specified by the skin. In other words, the merge of technologies between the skins engine and the full screen rendering engine allows a great deal of flexibility and control over the final product the user sees on-screen.

Referring further to FIG. 4, the relative position of controls 406, 408 within the visual image source can be dynamically changed to allow the controls to smoothly slide out of the way (off of the screen) when no longer in use. Conversely they can slide back into place when requested or needed. It is further contemplated to use any one of a number of animated transitions including, but not limited to, fading controls 406, 408 in and out. According to one embodiment of the invention, controls 406, 408 are "alpha-blended" with the visual rendering element to provide blend-in and blend-out animations.

In operation, computer 102 executes media player program 116 for rendering media file 112. According to the invention, the media file 112 has a visual rendering element and media player 116 plays this visual rendering element on the display (see monitor 966 in FIG. 9) of computer 102 in a full screen presentation mode on the display. The invention calls for selectively presenting at least playback control user interface 406 on the display in response to user input via an input device (see keyboard 956 or pointing device 958 in FIG. 9). In this instance, the user is able to view playback control UI 406 together with the visual rendering element while maintaining the full screen presentation mode.

Figure 5:
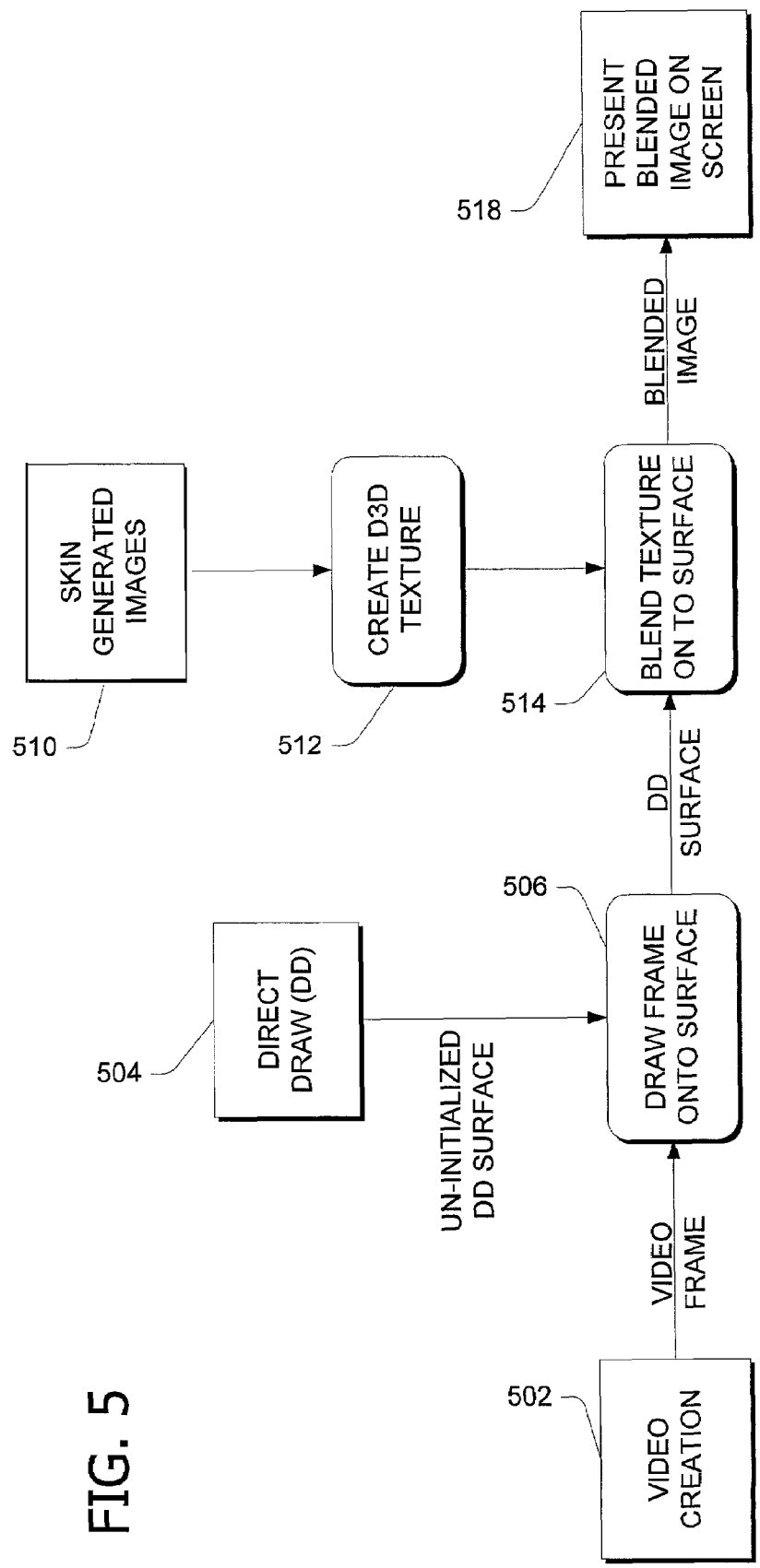
FIG. 5 is an exemplary flow diagram illustrating aspects of the playback control UI of FIG. 4.

FIG. 5 provides a flow diagram illustrating an exemplary alpha-blending operation. In this embodiment, the invention alpha-blends controls 406, 408 directly onto the visual image source (i.e., video, visualization, or other visual representation of the current media file 112). Alpha-blending allows for a translucent effect where the user clearly sees controls 406, 408 but can still view the underlying visual image source even through the controls. Those skilled in the art are familiar with alpha-blending and other similar techniques by which, for example, the color in a source bitmap is combined with that in a destination bitmap to produce a new destination bitmap.

Beginning at 502, video creation yields a standard video frame for processing. The invention uses, for example, a software interface at 504 to provide direct access to display devices while maintaining compatibility with the OS graphics device interface. The interface, embodied by a low-level API, provides a device-independent way for applications to gain access to the features of specific display devices. One suitable interface includes the DirectDraw® application programming interface available from Microsoft Corporation. The operation at 504 yields an uninitialized surface. In turn, the invention uses the un-initialized surface and the video frame at 506 to generate a surface object representing a linear array of display memory.

Referring further to FIG. 5, this embodiment of the invention provides at 510 skin generated images representative of controls 406, 408. At 512, the invention processes the images using, for example, a software interface for three-dimensional applications to create a texture. In this instance, the texture represents a rectangular array of pixels applied to a visual object. One suitable interface includes the Direct3D® application programming interface available from Microsoft Corporation, which provides a device-independent way for 3-D applications to gain access to the features of specific display devices. Blending the texture onto the surface at 514 creates a blended image, which is then presented on-screen at 518.

Advantageously, animating the alpha-blending level of controls 406, 408 onto the visual image source permits the translucency value to be changed over time to fade the controls in smoothly when needed and fade them out smoothly when no longer needed.

Figure 6:
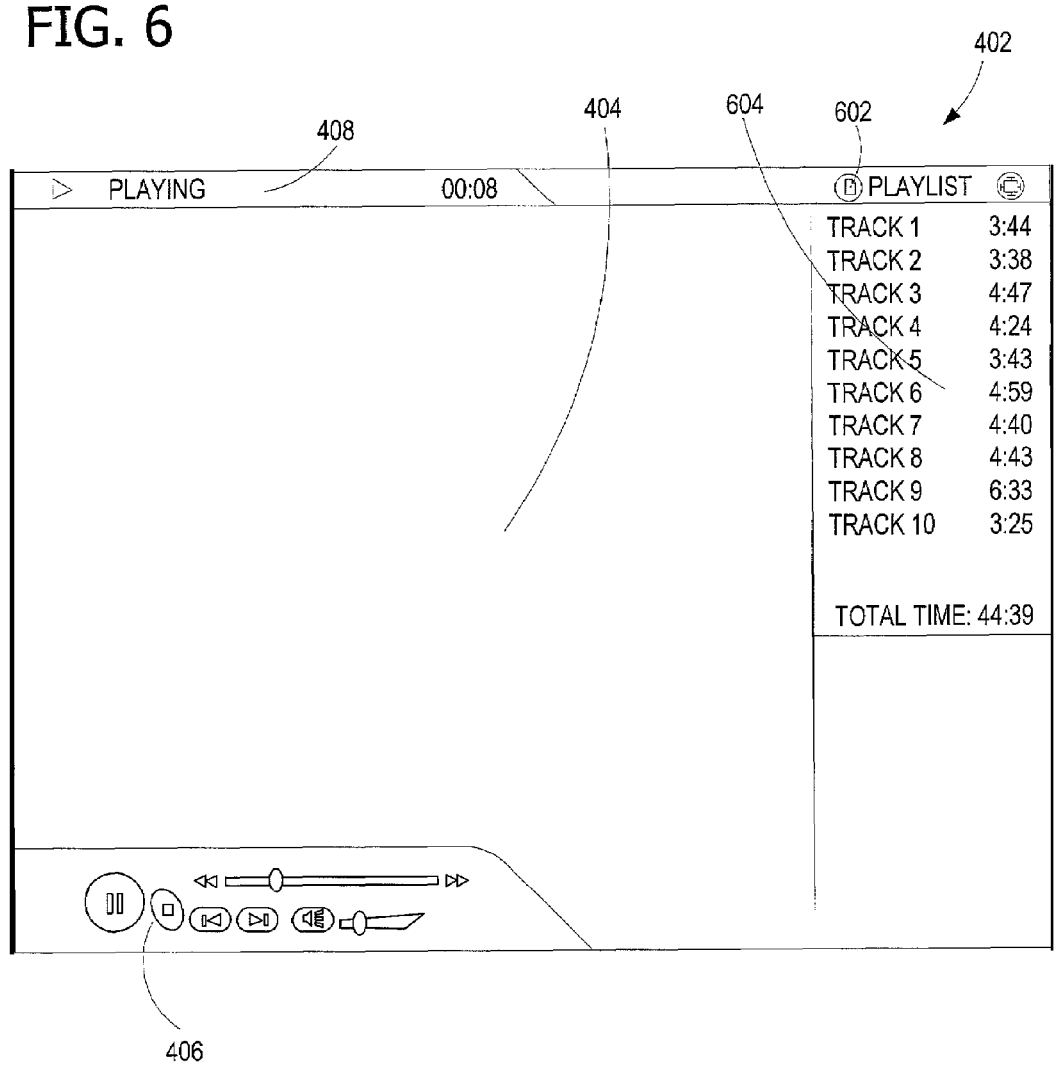
FIG. 6 is an exemplary embodiment of a full screen presentation mode with a playback control UI and playlist in a media player application program according to one embodiment of the present invention.

FIG. 6 illustrates another exemplary screen shot of user interface 402 for media player program 116. In this instance, media player program 116 is rendering media file 112 in a full screen presentation mode. When playing a video, for example, media player program 116 allows the user the option of watching the full screen representation 404 of media file 112. According to the invention, full screen UI 402 enhances user experience with its ability to selectively present playback controls 406 and status pane 408. In addition, UI 402 includes a button 602 for toggling on and off an interactive visual representation of a current playlist 604. In this embodiment, the user interface button 602 allows the user to view the playlist 604 of the available tracks or chapters.

Advantageously, the visual overview provided by playlist 604 allows the user to quickly understand exactly where the player is in relation to other items in playlist 604 with a brief glance. This also enables understanding of what media is upcoming and how much time is remaining in the playlist. In addition, this embodiment of the invention allows direct access to any item in playlist 604 even when media player program 116 is in full screen presentation mode. Previously, this functionality was only available by leaving full-screen, selecting a new track, and then returning, or by clicking "Next" or "Previous" multiple times until the desired track was played. Both of these features are very valuable in any large playlist, whether audio or video, and dramatically enhance user experience.

In operation, computer 102 executes media player program 116 for rendering media file 112. According to the invention, the media file 112 has a visual rendering element and media player 116 plays this visual rendering element on the display (see monitor 966 in FIG. 9) of computer 102 in a full screen presentation mode on the display. The invention calls for displaying playlist 604 associated with one or more media files, including the media file 112 being currently rendered by media player program 116, while maintaining the full screen presentation mode. Further, the invention provides direct media access to each item in playlist 604 in response to user input via an input device (see keyboard 956 or pointing device 958 in FIG. 9).

Figure 7:
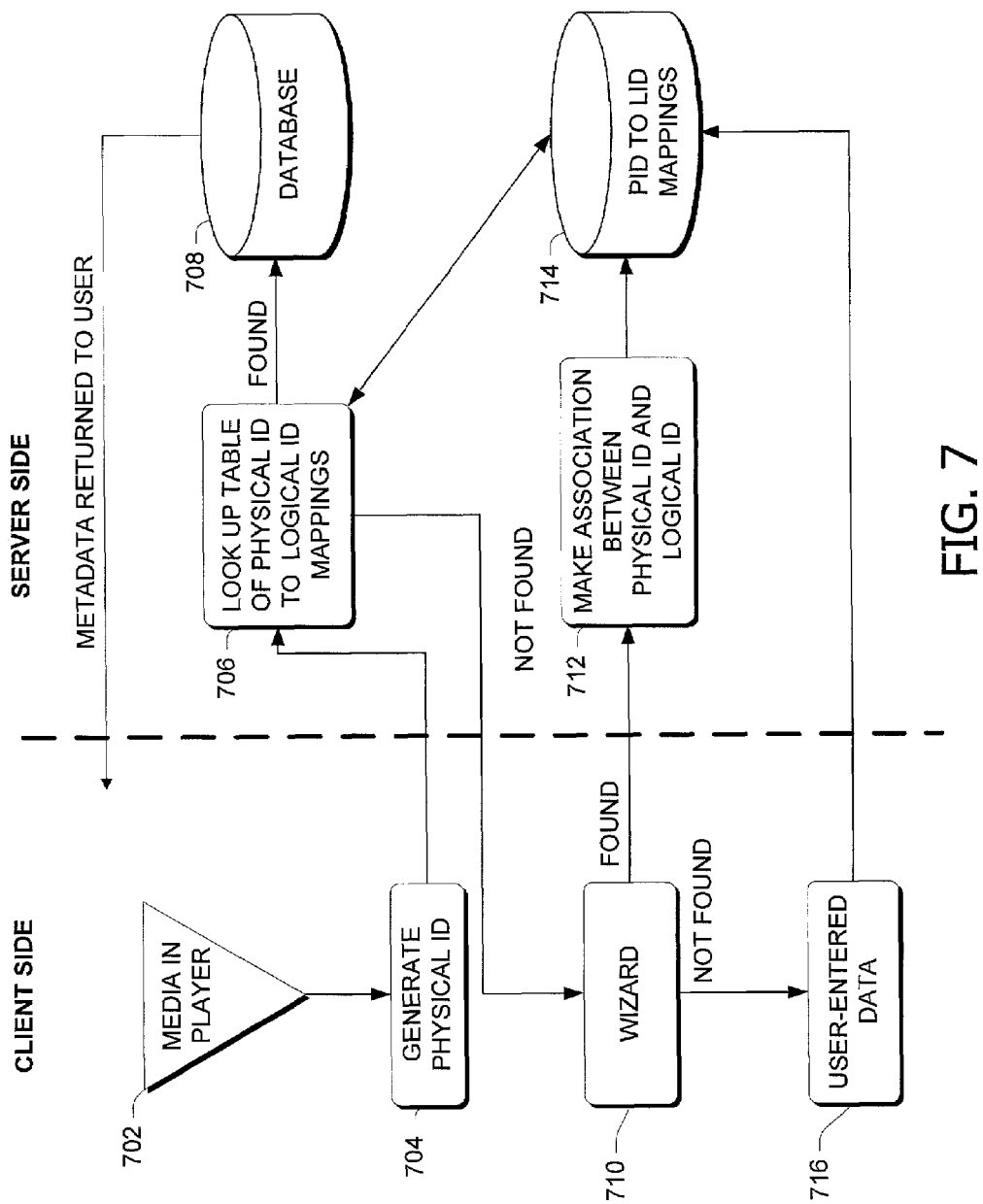
FIG. 7 is an exemplary flow diagram illustrating aspects of the operation of the system of FIG. 1.

Referring now to FIG. 7, those skilled in the art recognize that each media file 112 in which the content that is to be experienced by the user resides has a physical ID associated therewith. The physical ID is assigned or otherwise associated with a logical ID, which is then used as the basis for any database queries. With respect to the physical IDs that are associated with the media, any suitable method or technique of generating a physical ID can be used. For example, when a user inserts a piece of media into a properly configured and enabled device, software code can execute and read data from the physical media. The software code can then compose a unique or nearly unique physical ID from that data.

In the case where the media comprises a CD, the software code can read the offsets (in frames, which have a resolution of $\frac{1}{75}^{nd}$ of a second) of each track on the disc. A composite key or physical ID is then built from a string of the hex values of these offsets, prefaced by a number of tracks on the disc and finished with a representation of the total length of the disc.

In the case where the media comprises a DVD, the software code can read the first 64 kilobytes of two files that are guaranteed to be on every DVD. These files are VIDEO_TS.IFO and VTS_01_0.IFO. The former contains main-menu information (VMGI), and the latter contains title set information (VTSI) for the first title on the DVD. After the appropriate data blocks are read, the code generates a 64-bit CRC (cyclic redundancy code) checksum of the data, resulting in an appropriately unique key or physical ID. Of course, it is to be understood that the above two examples are simply two ways that a physical ID can be generated for two different types of media. Other methods of generating physical IDs, as well as other media types can be employed.

Calculation of the physical IDs takes place, in this example, on the client side by software code that executes on client computer 102. Such code can comprise part of a software-implemented media player (e.g., media player program 116) that is configured to play the media of interest.

Once the physical IDs are generated, client computer 102 sends the physical IDs to server 108 of the repository web site 120 via network 104 using a suitable protocol. FIG. 7 provides a work flow diagram to assist in understanding the processing that takes place, including generation of the physical IDs. In FIG. 7, the processing takes place on and between the client 102 and the server 108.

At 702, the user accesses a particular piece of digital media using enabled media player program 116, which generates a physical ID for the media at 704. According to one aspect of the invention, accessing the digital media in this manner may include converting the media file to a format compatible with media player program 116 (also referred to as "ripping"). Client computer 102 then bundles up the physical ID and sends it to server 108 for processing. This bundling can be done in any suitable way using any suitable protocols. In one example, the physical ID is passed, through an HTTP URL, to server 108. The server 108 can be configured in any suitable way (e.g., server 108 runs active server pages (ASP) code on the Internet Information Server web services product available from Microsoft Corporation). As will be understood by those skilled in the art, the code can also include a mechanism for converting the ASP request into a query request for a web-enabled database product, which supports for extensible markup language (XML), such as SQL Server also available from Microsoft Corporation.

The server 108 then uses the physical ID to query a lookup table 706 to determine whether there is a proper logical ID associated with it. The logical ID represents the piece of media in a metadata store or database 708 (i.e., database 110). If there is a logical ID associated with the physical ID, then that logical ID serves as a basis for a query of database 708. This query then returns, to the user, metadata associated with the user's media file 112. This metadata comprise a rich collection of data, with non-limiting examples being given above.

If, on the other hand, server 108 does not find a logical ID for the physical ID, then media player program 116 presents a wizard user interface 710 to the user on the client side. The wizard 710 attempts to find or establish the physical ID for the user's media file 112, which, in turn, will be used to establish the logical ID. For example, assume that the user starts playing a CD that has a physical ID that has not yet been processed by system 100. When server 108 attempts to look up a logical ID associated with the media's physical ID, no corresponding logical ID will be found. Accordingly, client computer 102 presents wizard 710 to the user and attempts to identify the user's media file 112. The wizard 710 attempts to identify the user's media because a logical ID that is associated with the media may already exist. For example, the same entitled CD, containing the same songs, can actually have several different physical IDs associated with it, yet there will be only one logical ID to which all of these physical IDs are mapped. If system 100 has not yet processed the physical ID, it will seek to establish an association between that physical ID and the logical ID that already exists in database 708 for that particular CD.

If client computer 102 successfully identifies media file 112 using wizard 710, and a logical ID for the file exists, then server 108 establishes a physical ID to logical ID mapping at 712. In this embodiment, the mapping is for the specific physical ID of the user's media file 112. Server 108 maps the specific physical ID to the logical ID that is associated with the user's media and stores the association in a database 714 (e.g., database 110) that contains physical ID to logical ID mappings.

On the other hand, if wizard 710 is unsuccessful in identifying the particular media file 112, then server 108 accepts data identifying the media entered by the user at 716. In one embodiment, the user-entered data 716 (e.g., title, tracks and artist) establishes a physical ID to logical ID mapping for media file 112, which in turn serves as a logical ID for all subsequent physical IDs associated with the particular media file 112. Consider, for example, a situation in which a particular user is the first system user to play a new CD. In this case, system 100 may not include a logical ID for the new physical media. Accordingly, media player program 116, through wizard 710, prompts the first user to enter any relevant information for the CD (i.e., title, artist, tracks, track titles, and the like), as well as a logical ID for the media so that an association can be established on server 108.

The exemplary search process described in connection with FIG. 7 allows the user to enjoy contextual data when playing media file 112. FIG. 2 illustrates an example of album art displayed in the "Now Playing" visualization area 210.

Figure 8:
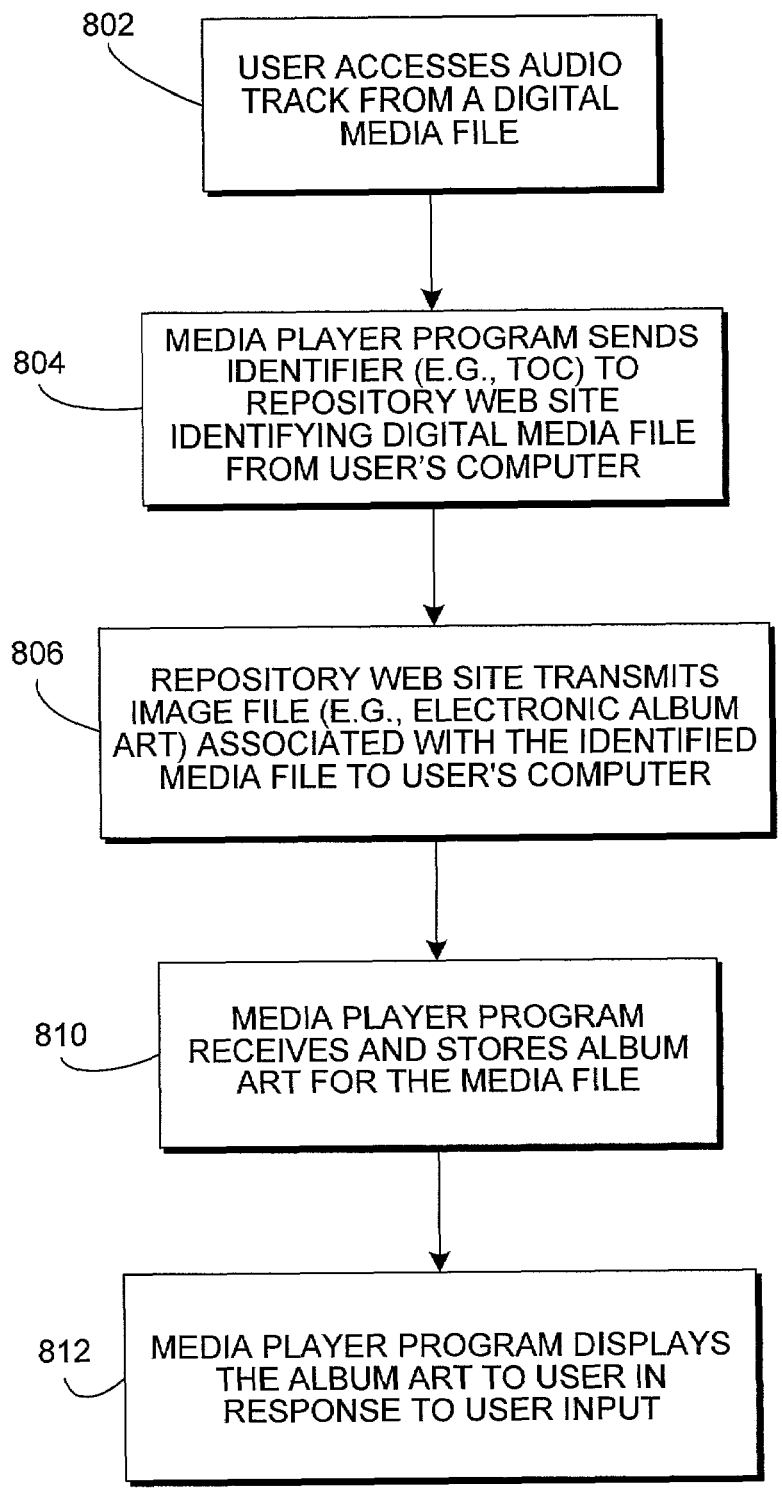
FIG. 8 is an exemplary flow diagram illustrating further aspects of the operation of the system of FIG. 1.

Referring next to FIG. 8, the user accesses ("rips") at 802 an audio track from a specific digital medium. The ripped track (i.e., digital media file 112) is stored on local storage media associated with the user's computer, such as client computer 102 in FIG. 1 and computer 900 described with reference to FIG. 9. If client computer 102 is connected to network 104, as described with reference to FIG. 1 and FIG. 9, media player program 116 executing on computer 102 sends, at 804, an identifier for digital media file 112 to server 108 of repository web site 120 via network 104. As described above, the identifier may take the form of a physical ID such as a table of contents (TOC) identifying the specific digital media file 112 based on the offsets of each track on the disc. The TOC, defined by a well-known specification referred to as the Red Book, identifies an audio CD based absolute times for the start of each track. The TOC, found in the CD's lead-in area, is expected to be the same for all like-entitled CDs published from the same source.

The repository web site 120 has access to database 110 storing, in addition to other metadata, electronic album cover art associated with the specific digital media file 112. In response to the received TOC (or the mapped logical ID), server 108 transmits at 806 one or more image files 208 associated with the identified media file 112 to the user's computer 102.

Referring further to FIG. 8, media player program 116 receives at 810 the electronic album art for digital media file 112 and stores a copy in the memory of client computer 102. In one embodiment, repository web site 120 arranges stored image objects in containers, each containing a plurality of thumbnail images and full images and server 108 sends retrieved electronic album art 208 to computer 102.

According to one embodiment of the invention, the client computer's operating system (see operating system 918 of FIG. 9) as well as its media player program 116 use the electronic album art 208. At 812 in FIG. 8, computer 102 displays the received electronic album art in response to user selection. Executing media player program 116, computer 102 displays the electronic album art in visualization area 210 of the media player when playing the content of digital media file 112. Advantageously, client computer 102 need not be online, i.e., connected to repository web site 120 via network 104, to view the image files.

Visualizations enhance user experience by adding a visual component to an audio digital file. In one form, visualizations are COM controls used by media player program 116 to turn audio waveforms into animated graphics. The COM controls are packaged as dynamically linked libraries registered in the operating system registry. When media player program 116 runs, registered custom visualizations are loaded and viewed in accordance with the instructions of the skin being used by the media player.

Those skilled in the art will note that operation of software routines of the invention can be implemented in numerous ways all within the scope of the invention. For example, the method illustrated in FIG. 8 may be implemented as a set of APIs available to media player program 116 and to the operating system executing on computer 102. In another embodiment, the software routines described herein may be implemented as an application program executing on computer 102 that interfaces with the operating system and media player program 116 to perform the method illustrated in FIG. 8. In yet another embodiment, the software routines described herein may be implemented as part of the operating system executing on computer 102 with an API available to the media player. Further, as described with reference to FIG. 8, the functionality of the invention may be implemented using commands available in HTTP. In addition, those skilled in the art will note that functionality of the repository web site 120 may be implemented in numerous ways including, but not limited to, an API that interacts with the media player program 116 or operating system of computer 102 to deliver the requested electronic art to computer 102.

FIG. 9 shows one example of a general purpose computing device in the form of a computer 900. In one embodiment of the invention, a computer such as the computer 900 is suitable for use in executing media player program 116.

In the illustrated embodiment, computer 900 has one or more processors or processing units 902 and a system memory 904. A system bus 908 couples various system components including the system memory 904 to the processors 902. The bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 900 typically has at least some form of computer readable media. Computer readable media, which include both volatile and nonvolatile media, removable and non-removable media, may be any available medium that can be accessed by computer 900. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, BEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 900. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 904 includes computer storage media in the form of removable and/or non-removable, volatile and/or nonvolatile memory. In the illustrated embodiment, system memory 904 includes read only memory (ROM) 910 and random access memory (RAM) 912. A basic input/output system 916 (BIOS), containing the basic routines that help to transfer information between elements within computer 900, such as during startup, is typically stored in ROM 910. The RAM 912 typically contains data and/or program modules that are immediately accessible to and/or presently being operated on by processing unit 902. By way of example, and not limitation, FIG. 9 illustrates operating system 918, application programs 920 (e.g., media player 116), other program modules 924, and program data 926.

The computer 900 may also include other removable/non-removable, volatile/nonvolatile computer storage media. For example, FIG. 9 illustrates a hard disk drive 930 that reads from or writes to non-removable, nonvolatile magnetic media. FIG. 9 also shows a magnetic disk drive 932 that reads from or writes to a removable, nonvolatile magnetic disk 934, and an optical disk drive 936 that reads from or writes to a removable, nonvolatile optical disk 938 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 930, and magnetic disk drive 932 and optical disk drive 936 are typically connected to the system bus 908 by a non-volatile memory interface, such as interface 942.

The drives or other mass storage devices and their associated computer storage media discussed above and illustrated in FIG. 9, provide storage of computer readable instructions, data structures, program modules and other data for the computer 900. In FIG. 9, for example, hard disk drive 930 stores operating system 946, application programs 948, other program modules 950, and program data 952. Note that these components can either be the same as or different from operating system 918, application programs 920, other program modules 924, and program data 926. Operating system 946, application programs 948, other program modules 950, and program data 952 are given different numbers here to illustrate that, at a minimum, they are different copies.

For purposes of illustration, programs and other executable program components, such as the operating system 918, 946, are illustrated herein as discrete blocks. It is recognized, however, that such programs and components reside at various times in different storage components of the computer, and are executed by the data processor(s) of the computer. For example, FIG. 9 shows media player 116 stored in system memory 904. Those skilled in the art understand that components of media player 116 may reside in system memory 904, hard disk drive 930, or both.

Referring further to FIG. 9, a user may enter commands and information into computer 900 through input devices such as a keyboard 956 and a pointing device 958 (e.g., a mouse, trackball, pen, or touch pad). Other input devices known in the art include an audio/video input device(s) 960 as well as a microphone, joystick, game pad, satellite dish, scanner, or the like (not shown). These and other input devices are connected to processing unit 902 through a user input interface 964 that is coupled to system bus 908, but may be connected by other interface and bus structures, such as a parallel port, game port, or a universal serial bus (USB). As is well known in the art, application programs 920, 948 are often configured to present a user interface (UI). The UI allows a user to interact with the application program in some manner using some type of input device (e.g., keyboard 956 or pointing device 958). This UI is typically a visual display that is capable of receiving user input and processing that user input in some way. By way of example, the UI presents one or more buttons or controls that can be clicked on by a user.

A monitor 966 or other type of display device is also connected to system bus 908 via an interface, such as a video interface 968. In addition to the monitor 966, computers often include other peripheral output devices (not shown) such as a printer and speakers, which may be connected through an output peripheral interface (not shown).

The computer 900 may operate in a networked environment using logical connections to one or more remote computers, such as a remote computer 972. The remote computer 972 may be a personal computer, a server, a router, a network PC, a peer device or other common network node, and typically includes many or all of the elements described above relative to computer 900. The logical connections depicted in FIG. 9 include a local area network (LAN) 974 and a wide area network (WAN) 976, but may also include other networks. Such networking environments are commonplace in offices, enterprise-wide computer networks, intranets, and global computer networks (e.g., the Internet).

When used in a local area networking environment, computer 900 is connected to the LAN 974 through a network interface or adapter 980. When used in a wide area networking environment, such as the Internet, computer 900 typically includes a modem 982 or other means for establishing communications over the WAN 976. The modem 982, which may be internal or external, is connected to system bus 908 via the user input interface 964, or other appropriate mechanism. In a networked environment, program modules depicted relative to computer 900, or portions thereof, may be stored in a remote memory storage device (not shown). By way of example, and not limitation, FIG. 9 illustrates remote application programs 984 as residing on the memory device. It will be appreciated that the network connections shown are exemplary and other means of establishing a communications link between the computers may be used.

Generally, the data processors of computer 900 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

Although described in connection with an exemplary computing system environment, including computer 900, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 900 executes computer-executable instructions such as those illustrated in FIGS. 5, 7, and 8.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A method of processing media content comprising:
rendering a media file by a media player program executed on a computer, said computer having a display for presenting a user interface (UI) associated with the media player program;
defining a window in which the media player program UI is presented on the display, said window having a rectangular frame visibly defined by frame borders controlled by an operating system of the computer, said rectangular frame including one or more menu controls for interacting with the media player program within the visible frame borders;
setting a visible region of the window, said visible region defining an outer edge within the rectangular frame of the defined window, said visible region excluding at least a portion of the window outside the outer edge from being viewable on the display, said excluded portion of the window within the rectangular frame including the frame borders and the one or more menu controls;
automatically detecting user input via an input device, said detected user input being positioned adjacent to the outer edge of the visible region of the window; and
selectively making the excluded portion of the window within the rectangular frame including the one or more menu controls and the frame borders visible in response to the detected user input whereby the entire defined window within the rectangular frame and the frame borders are viewable on the display.

2. The method of claim 1 wherein the input device comprises a pointing device for controlling a cursor and wherein detecting comprises automatically detecting the cursor being positioned adjacent to the outer edge of the visible region of the window and selectively removing the portion of the window within the rectangular frame in response thereto.

3. The method of claim 2 further comprising re-setting the visible region of the window for excluding the portion of the window within the rectangular frame from being viewable on the display after the cursor is no longer positioned adjacent the outer edge of the visible region.

4. The method of claim 1 wherein the input device comprises a keyboard and farther comprising detecting one or more keys on the keyboard being depressed and selectively removing the portion of the window within the rectangular frame in response thereto.

5. The method of claim 4 wherein the one or more keys being depressed on the keyboard comprise an accelerator key for performing a predefined function.

6. The method of claim 5 further comprising re-setting the visible region of the window for excluding the portion of the window within the rectangular frame from being viewable on the display after completion of the accelerator key function.

7. The method of claim 1 further comprising re-setting the visible region of the window for excluding the portion of the window within the rectangular frame from being viewable on the display after a predetermined interval of time.

8. The method of claim 1 wherein the portion of the window within the rectangular frame excluded by the visible region from being viewable on the display includes a title bar, wherein said title bar includes the one or more menu controls.

9. The method of claim 8 wherein selectively removing the portion of the window within the rectangular frame causes the title bar to be viewable on the display and permits the one or more menu controls to be available to the user via the title bar.

10. The method of claim 9 further comprising re-setting the visible region of the window for excluding the portion of the window within the rectangular frame from being viewable on the display after the menu control UI is no longer in use.

11. The method of claim 1 wherein setting the visible region of the window comprises executing a SetWindowRgn application programming interface.

12. The method of claim 1 wherein setting the visible region of the window comprises defining a skin for the media player program.

13. The method of claim 1 wherein the media file includes a visual rendering element and wherein rendering the media file includes playing the visual rendering element of the media file in a full screen presentation mode.

14. The method of claim 13 further comprising alpha-blending a playback control UI with the visual rendering element while maintaining the full screen presentation mode.

15. The method of claim 14 wherein the playback control UI is translucent.

16. The method of claim 14 further comprising animating the playback control UI.

17. The method of claim 16 wherein animating the playback control UI comprises selectively fading in and fading out the playback control UI in response to user input.

18. The method of claim 16 wherein animating the playback control UI comprises selectively sliding in and sliding out the playback control UI in response to user input.

19. The method of claim 2 wherein the input device comprises the pointing device for controlling the cursor and further comprising automatically detecting movement of the cursor and selectively animating the playback control UI in response thereto.

20. The method of claim 14 further comprising defining a skin for the media player program, said skin implementing the playback control UI.

21. The method of claim 14 further comprising defining a non-rectangular region in which the playback control UI is viewable.

22. The method of claim 13 further comprising providing a playlist associated with one or more media files, including the media file being currently rendered by the media player program, while maintaining the full screen presentation mode.

23. The method of claim 22 further comprising providing direct media access to each item in the playlist.

24. The method of claim 1 further comprising:
sending an identifier of the media file from the computer to a server associated with a central database, said central database storing metadata corresponding to media files, said computer and said server being coupled to a data communication network;
retrieving metadata corresponding to the media file from the central database via the data communication network, said metadata being retrieved in response to the identifier sent from the computer to the server and including at least one image file corresponding to the media file being rendered by the media player program, said image file relating to content of the media file; and
displaying the image file by the computer when the media player program renders the media file corresponding thereto.

25. The method of claim 24 wherein the media file includes digital content of one or more tracks of a compact disc and wherein the identifier is representative of offset of the tracks on the disc.

26. The method of claim 24 wherein the media file includes digital content of a digital versatile disc and wherein the identifier is representative of menu information on the disc.

27. The method of claim 1 wherein one or more computer-readable storage media have computer-executable instructions for performing the method of claim 1.

28. A system for processing media content comprising a computer executing a media player program for rendering a media file, said computer having a display for presenting a user interface (UI) associated with the media player program, said display having a window in which the media player program UI is presented, said window having a rectangular frame visibly defined by frame borders controlled by an operating system of the computer, said rectangular frame including one or more menu controls for interacting with the media player program within the visible frame borders; said window further having a visible region applied thereon, said visible region defining an outer edge within the rectangular frame of the defined window, said visible region excluding at least a portion of the window within the frame borders from being viewable on the display, said portion of the window within the rectangular frame including the frame borders and the one or more menu controls for interacting with the media player program wherein the portion is selectively removed in response to user input via an input device whereby the entire defined window within the rectangular frame is viewable on the display, said input being automatically detected when positioned adjacent to the outer edge of the visible region of the window.

29. The system of claim 28 wherein the input device comprises a pointing device for controlling a cursor and wherein the portion of the window within the rectangular frame is selectively removed in response to the cursor being positioned adjacent an outer edge of the visible region of the window.

30. The system of claim 29 wherein the visible region of the window is re-set for excluding the portion of the window within the rectangular frame from being viewable on the display after the cursor is no longer positioned adjacent the outer edge of the visible region.

31. The system of claim 28 wherein the input device comprises a keyboard and wherein the portion of the window within the rectangular frame is selectively removed in response to one or more keys on the keyboard being depressed.

32. The system of claim 31 wherein the one or more keys being depressed on the keyboard comprise an accelerator key for performing a predefined function.

33. The system of claim 32 wherein the visible region of the window is re-set for excluding the portion of the window within the rectangular frame from being viewable on the display after completion of the accelerator key function.

34. The system of claim 28 wherein the visible region of the window is re-set for excluding the portion of the window within the rectangular frame from being viewable on the display after a predetermined interval of time.

35. The system of claim 28 wherein the portion of the window within the rectangular frame excluded by the visible region from being viewable on the display includes a title bar, said title bar permitting a menu control UI to be available to the user via the title bar when viewable on the display.

36. The system of claim 35 wherein the visible region of the window is re-set for excluding the portion of the window within the rectangular frame from being viewable on the display after the menu control UI is no longer in use.

37. The system of claim 28 further comprising one or more computer-readable storage media having computer-executable instructions for executing a SetWindowRgn application programming interface to define the visible region.

38. The system of claim 28 wherein the media player program has a full screen presentation mode for playing a visual rendering element of the media file.

39. The system of claim 38 further comprising a playback control UI alpha-blended with the visual rendering element while maintaining the full screen presentation mode.

40. The system of claim 39 wherein the playback control UI is translucent.

41. The system of claim 39 wherein the playback control UI selectively fades in and fades out in response to user input.

42. The system of claim 41 wherein the playback control UI selectively slides in and slides out in response to user input.

43. The system of claim 39 wherein the playback control UI is viewable in a non-rectangular region.

44. The system of claim 38 further comprising a playlist UI associated with one or more media files, including the media file being currently rendered by the media player program, while maintaining the full screen presentation mode, said playlist UI providing direct media access to each item in the playlist.

45. The system of claim 28 further comprising a central database storing metadata corresponding to a plurality of media files and a server associated with the central database, said server and said computer being coupled to a data communication network, said server receiving and responsive to an identifier of the media file sent by the computer via the data communication network for retrieving metadata corresponding to the media file from the central database, said metadata including at least one image file corresponding to the media file, said image file relating to content of the media file, said computer displaying the image file when the media player program renders the media file corresponding thereto.

46. The system of claim 45 wherein the media file includes digital content of one or more tracks of a compact disc and wherein the identifier is representative of offset of the tracks on the disc.

47. The system of claim 45 wherein the media file includes digital content of a digital versatile disc and wherein the identifier is representative of menu information on the disc.

* * * * *